United States Patent [19]
Andersson

[11] 3,772,912
[45] Nov. 20, 1973

[54] LOAD CELL COMPRISING TWO MUTUALLY MOVABLE MEMBERS IN A MEASURING DIRECTION

[75] Inventor: John-Erik Andersson, Karlskoga, Sweden

[73] Assignee: Aktiebolaget Bofors, Bofors, Sweden

[22] Filed: May 19, 1971

[21] Appl. No.: 144,831

[30] Foreign Application Priority Data
June 1, 1970 Sweden.............................. 7551/70

[52] U.S. Cl. .................................. 73/141 A, 338/5
[51] Int. Cl. ............................................. G01l 1/22
[58] Field of Search........................ 73/141 A; 338/5

[56] References Cited
UNITED STATES PATENTS

| | | | |
|---|---|---|---|
| 3,376,537 | 4/1968 | Pugnaire...................... | 73/141 A X |
| 3,103,810 | 9/1963 | Agerman et al. ................ | 73/141 A |
| 3,184,964 | 5/1965 | Hedrick et al..................... | 73/141 A |

Primary Examiner—Charles A. Ruehl
Attorney—Hane, Baxley & Spiecens

[57] ABSTRACT

A load cell comprises two identical members, mutually movable along a central axis, connected by at least one membrane formed by cavities wherein the membrance includes a plane defined by the central and mutual axes of the load cell with strain gauges on the membrane which acts as the web portion of an I-beam.

11 Claims, 10 Drawing Figures

PATENTED NOV 20 1973 3,772,912

LOAD CELL COMPRISING TWO MUTUALLY MOVABLE MEMBERS IN A MEASURING DIRECTION

The present invention relates to a load cell comprising two mutually movable members, which are mutually movable in the measuring direction connecting with or running in parallel with a first axis (e.g., the centering axis) extending through the members. Generally, on such a load cell the forces to be measured are transmitted via two opposite sides of the two members. The load cell then is fitted with strain gauges which are actuated by the deformations occuring in the material of the load cell and which, in dependence on these deformations, will transmit an output. In most of the applications of the load cells or transducers a strong desire exists that the load cell itself, besides the fact that it must be sensitive for the forces in the measuring direction, shall be mechanically insensitive to forces perpendicular to the measuring direction, and of course, one also desires that the output emitted by the load cell shall not be disturbed by such side forces. Such such a load cell would have the great advantage that one could eliminate the flexural supports in the shape of membranes, bars, links etc. which are necessary in the already known load cells in order to prevent breakdown of the cells when these are used where side forces exist. Since such flexural supports in simple and robust elements not only take up side forces, but also a part of the force to be measured they have an negative influence on the measuring accuracy because i.e., problems associated with nonlinearity, asymmetry, and temperature will occur. Then, if there is a demand that the load cell have a great measuring accuracy an extremely complex construction must be allotted to the flexural supports as exemplified, i.e., by the U.S. Pat. Nos. 2,793,851 and 2,901,235.

In addition to the elimination of the flexural supports a particular need exists that one shall be able to apply the load to be measured excentrically on the load cell, without risking mechanical local overloading of the load cell and without exceeding its rated deviation. For instance, one wishes often to be able to apply the measuring force on a surface which is in parallel with the first or centering axis.

Considering, for instance, the load cell according to the U.S. Pat. No. 3,376,537 one would want to be able to displace the measuring force, which on the said load cell must act along the first axis, both in the direction of the second axis and in the direction of the third axis, without damaging of the load cell and without exceeding a fault margin of 0.5 percent. These requirements cannot be met by the mentioned load cell.

It is an object of the invention to solve these problems.

The invention is characterized by two members mutually movable along a central axis which are connected by at least one membrane upon which are mounted strain gauges.

In addition to the above mentioned advantages one will obtain with this invention a load cell which is extremely expedient for utilization in the most different connections. Moreover, the load cell will be economical to make, i.e. because the surfaces which uphold the strain gauges can be made even and easily accessible, and, furthermove, the load cell according the invention will easily permit the strain gauges to be sheltered from the enclosing milieu. Depending on the connection in which the load cell is to be used the embodiments of the members can be varied, and thus the members can together create a body which essentially has the form of a preferably right-angled parallelepiped, cube, cylinder or another configuration with rotary symmetry etc.

The invention is described below particularly with reference to the accompanying drawings, in which illustrative embodiments of the load cell according to the invention are represented.

Figure 1A:
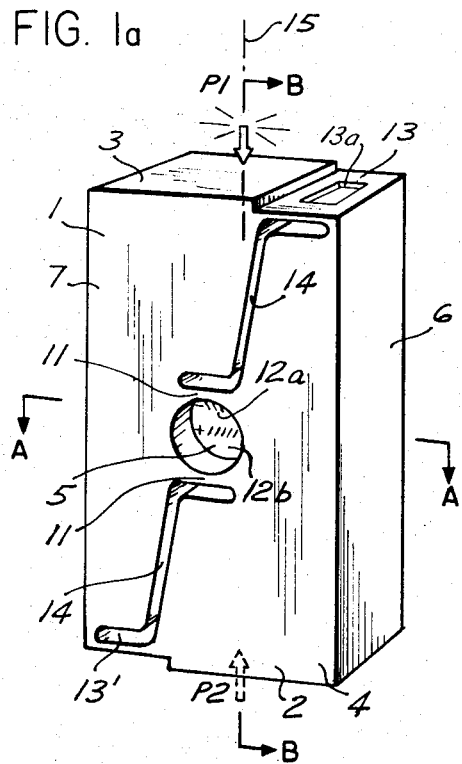
FIG. 1a is a perspective view of a first embodiment of the load cell.
Figure 1C:
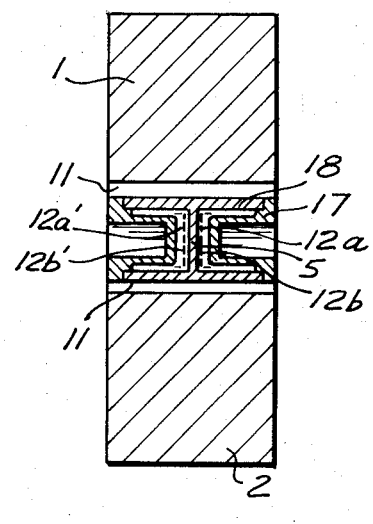
FIG. 1c is a vertical view of a cross-section of the load cell in FIG. 1a, taken along the line B—B.
Figure 1B:
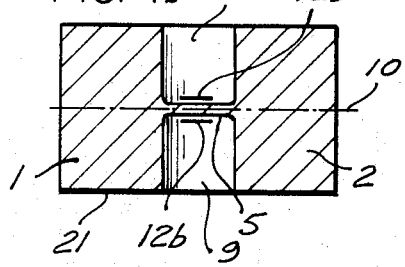
FIG. 1b is a horizontal view of a cross-section of the load cell in FIG. 1a, taken along the line A—A.

In the figures embodiments are illustrated where both the mutually movable members together form a body in the shape of a right-angled parallelepiped. FIG. 1a – 1c show by 1 and 2 the mutually movable members, the members of which 1 comprises one side or surface 3 and the other member 2 the second side or suface 4 of two opposite sides. The members 1 and 2 are movable in relation to each other in a measuring direction which coincides or which runs in parallel with a first axis 15, which may be seen as a centering axis and which passes through the members 1 and 2. The members 1 and 2 are connected with each other over an intermediate section (5, 11) performed with material diminishings or thinnings and running at an angle to the first axis and criss-crossed both by the said first axis 15 and by a second axis 10 perpendicular to the first axis and working as neutral axis in the embodiment of the FIG. 1. The members are also connected via two membranes 13, 13' resilient in the measuring direction and located on respective sides of the second axis 10 and essentially perpendicularly arranged to the first axis 15. The angle that the intermediate section shows in relation to the first axis 15 is 90° in the example of the embodiment. By virtue of its position the intermediate section will be shearing weak but bending rigid.

By the material diminishings the intermediate section is provided with what can be seen as a shearing section 5 where the strain gauges sense the beam deformations in the material of the load cell when the forces are applied on the load cell. The shearing section 5 is placed partly between the two opposite sides 3 and 4 and partly between two other opposite sides 6 and 7 which are perpendicular to the sides 3 and 4. The material diminishings have been made by means of cavities 8 and 9 made in the beam material, which cavities have identical shapes and moreover, have such depths that the remaining material is close to the neutral axis 10 of the load cell. In this way the shearing section 5 can be seen as the web of an I-beam, whose flanges extend in one of the transversal directions of the load cell, namely the transversal direction which is perpendicular to the figure plane of the FIG. 1c where the flanges have the reference numeral 11. The web of the I-beam (= material diminishings) causes strain gauges 12a, 12a', 12b and 12b '. Moreover, the intermediate section will comprise elements which extend in right angles to the measuring direction and which consists of the flanges of the I-beam. However, it is possible to wholly exclude the flanges in the example according to FIG. 1a – 1c and increase the depth of the shearing section by allowing this section to run as a membrane between the slots 14 which separate the members 1 and 2 from each other. It is also possible to shorten the breadth of the flanges of the I-beam.

The described construction makes a load cell having excellent qualities. By the placing of the shearing section in the middle of the body of the load cell close to the neutral axis 10 of the body the strain gauges can be positioned close to the point of inflection of the moment of flexure in the length direction of the I-beam, i.e., the direction perpendicular to the figure plane according to FIG. 1c. Through this placing the strain gauges essentially will be sensitive for only the deformations caused by shearing stress in the material, which shearing stress partly will be particularly conspicuous in the shown example because of the material diminishings said partly are proportional to the transverse forces in the shearing section occuring at the applying of the load, whereby the load cell will be extraordinarily sensitive for forces in the measuring direction. From the mentioned fact it is apparent that, for instance there is no need for a force P1 to actuate the load cell along its centering axis 15, but the force can also be displaced in the figure plane of FIG. 1a because such a displacing will not have any influence on the output. From the mechanical point of view the load cell will withstand this displacing very well because the flanges 11 and the membranes 13 will have a high force absorbing ability. Thus the forces P1 and P2 very well can be displaced so that they instead can be applied to the sides 6 and 7, i.e., so that the load cell is strained between two parallel force transmitting surfaces, and considerable side forces perpendicular to the measuring direction and coinciding with the figure plane can be applied towards both or some of the movable members.

This embodiment of the load cells also permits the displacing of the forces P1 and P2 or genuine side forces perpendicular to the figure plane in the FIG. 1a. Even in this direction the flanges and membranes have a large absorbing capacity from the mechanic point of view, and the strain gauges applied on each side of the web can be interconnected in a simple way in a Wheatstone-bridge so that the proportion of the measuring output is not affected by the force displacement, i.e., potentially occuring forces in the shearing section caused by other forces than transverse forces (e.g., bending or torsion) will be electrically eliminated in the bridge.

In practice, experimental works have proved that a load cell in accordance with the present invention quite easily can be constructed to withstand side forces as 100 percent of the rated force in the measuring direction, in spite of the fact that the membranes and flanges then are taking up only 1 percent of the mentioned rated force. This result should be compared with already known load cell which with flexural supports which take up 1 percent of the rated force are able to withstand only 10 percent of the said rated force, without risks for mechanical overloading.

Figure 2A:
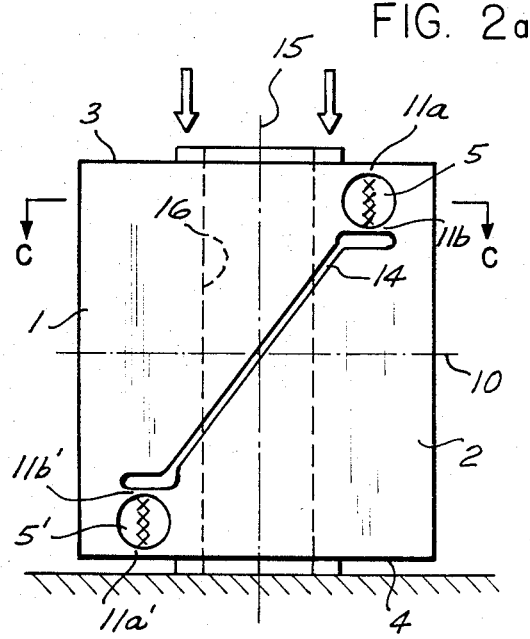
FIG. 2a is a vertical view of a second embodiment of the load cell.
Figure 2B:
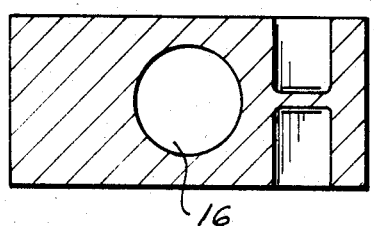
FIG. 2b is a horizontal view of a cross-section of the load cell in FIG. 2a, taken along the line C—C.

The embodiment according to FIG. 2a and 2b is utilized when the load cell should have a concentrical through hole 16. In this case the members 1 and 2 are connected to each other over two intermediate sections (5, 11a, 11b and 5', 11a', 11b') performed with material diminishings, extending at angles to the first axis 15 and located on respective sides of the second or symmetry axis 10 and criss-crossed by a plane coinciding with the first and second axes (= plane of the FIG. 2a). Even in this embodiment the said angles for the intermediate sections are perpendicular to the first axis. Thus the membranes 13 are excluded and are replaced wholly with the flanges 11 in the respective intermediate section, which flanges together with the shearing section 5 form the actual I-beam. The characteristics of the load cell taken by itself do not change, even if it will be suitable to increase the number of strain gauges. In the case where the membranes 13 close to the opposite sides 3 and 4 cannot be thin enough because of, for example, manufacturing reasons it is suitable to provide these membranes with one or more through holes, whereby the influence of the membrane on the force applied on the load cell in a simple way will be limited.

The shape of the shearing section 5 can also be varied. For instance, it is possible to exclude the flanges 11b and 11b' and permit the shearing section to reach the slot 14, and in the same way it is possible to exclude flanges 11a and 11a' and allow the section 5 to reach the surfaces 3 and 4.

Figure 3A:
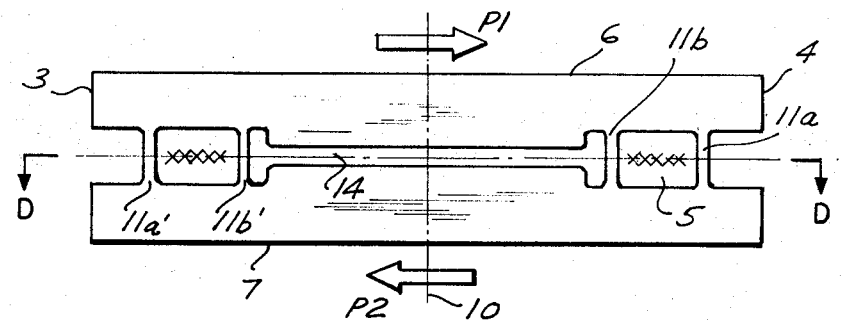
FIG. 3a is a vertical view of a third embodiment of the load cell.
Figure 3B:
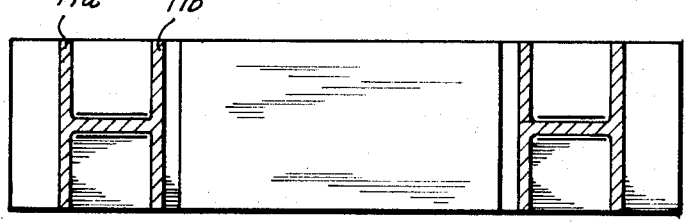
FIG. 3b is a horizontal view of a cross-section of the load cell in FIG. 3a, taken along the line D—D.

From the above described load cells it is apparent that they through their simple embodiments are simple to make. The members 1 and 2 can be worked out from a homogeneous body which is provided with the necessary slots and holes, if any, and cavities for obtaining material diminishings. The depths of the slots 14 easily can be varied from one case to another so that the load cell can be shaped for its special purposes. An example of this is illustrated in FIG. 3a and 3b which are intended to show a load cell of extremly low profile where the force to be measured is transmitted to both the sides 6 and 7 which are prependicular to the two opposite sides 3 and 4. By arranging the load cell in this position it will be able to support a large tare load for example on its side 6, which tare load essentially will be taken up by the membranes 13. FIG. 3a also shows that the shearing section not necessary may have a circular form, but very well can be shaped to the special need.

Another great advantage with the present invention is that the strain gauges in a simple way can be hermetically sealed by means of a cap formed component which is provided with a lip-locking flange 17 (FIG. 1c) which will lie close to and be attached to edge surfaces arranged at the cavities 8 and 9 so that the external face 18 of the component is turned inwards. The attachment can be performed for example by welding. Through this construction of the component one will be able to perform resilient moves at the applying of the load on the load cell and, then, will not disturb the output of the load cell. In the already known load cells one is forced to cover the whole load cell (the sensitive element)

with a sheltering casing, which one has been forced to perform very carefully in order to prevent the casing from disturbing the measuring of the load cell.

Figure 4:
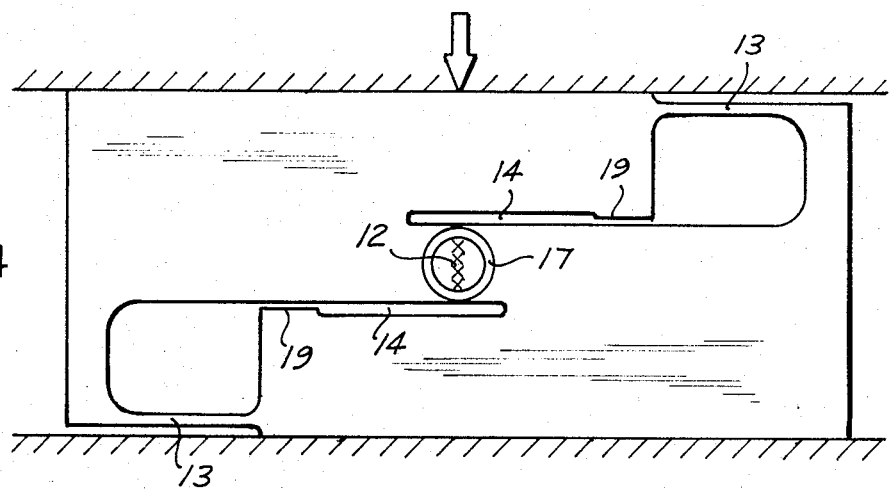
FIG. 4 is a vertical view of a modified embodiment of the load cells in FIG. 1a – 3b.

FIG. 4 illustrates another embodiment of the present invention wherein the shearing sections in the respective intermediate section between the members 1 and 2 are replaced with a part or parts which work as a beam or beams. The beam is obtained by elongation of the slots 14. Then, the beam is provided with material diminishings so that a membrane or disc will be created and which extends between the ends of the slots 14 or so that an I-beam-locking cross-section is obtained, whereby the membrane, the web of the I-beam, carries strain gauges. The strain gauges will in this case be sensitive for deformations in the material caused by the shearing stress in the membrane or the web of the I-beam, which shearing stress occur as a consequence of the bending of the beam at the applying of the force on the load cell. The advantage with such a load cell is that overload supports easily can be applied in the load cell, for example in the shape of heads 19 applied in one of or both the slots 14 preferably where the slots are perpendicular to the measuring direction.

Figure 5:
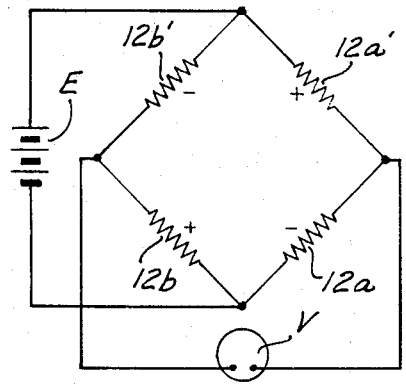
FIG. 5 is a diagram of the interconnection of the strain gauges in a Wheatstone-bridge.

The strain gauges can vary both in number and construction, and, in view of FIG. 1a – 1c, it can be suitable to apply on each side of the created web of the I-beam a double strain gauge with two sensitive elements, 12a and 12b and 12a' and 12b'. The elements of the strain gauge on each side then are applied so they are influenced by the deformations of the material in two mutually right-angled directions which have 45° directions to the length direction axis of the I-beam. Then the elements 12a and 12b' will be influenced by a negative extension, while both the other elements 12a' and 12b will be influenced by a positive extension in the material. The four strain gauge elements are interconnected in the four members of a conventional electric Wheatstone-bridge as shown in FIG. 5. The diagonal of the bridge then is connected to a voltage source E, while its other diagonal is connected to a voltmeter V. The elements 12a' and 12b used for positive extensions are interconnected in the two opposite first members of the bridge, while the elements 12a and 12b' used for negative extention are interconnected in the other two opposite members. Under the influence of the shearing stress in the shearing section caused by the load applied on the load cell the resistance increases in the elements 12a' and 12b, while the resistance in the other elements 12a and 12b' decreases, whereby the unbalance in the bridge measured by means of the voltmeter V will be a measure of the size of the load or force applied on the load cell.

A bending caused by a displacing of the force in the figure plane according to FIG. 1 actuates the strain gauges 12a, 12a', 12b and 12b' so they are allotted the same extension, but with such orientations that they do not give any unbalance in the bridge. In a corresponding way balancing is obtained when the displacing of the force in a right angle to the figure plane accordingly to FIG. 1a takes place. Furthermore, this electrical balancing guarantees that the load cell will emit a measuring output which with an uppermost large accuracy is proportional to the applied load independent of the position of the load on the load cell.

Figure 6:
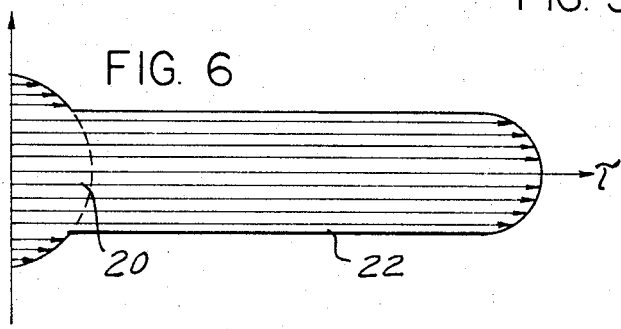
FIG. 6 is a diagram of the distribution of the shearing stress in a shearing section on the load cell with and without material diminishings.

In order to obtain a load cell with extreme qualities with respect the measuring accuracy the material diminishings have a decided importance at least in the case where both the members 1 and 2 of the load cell together create a parallelepiped. This fact is illustrated by means of FIG. 6 where a partly dashed curve 20 shows the distribution of the shearing stresses in the shearing section 5 and flanges 11 in the case when the material diminishings are excluded and the strain gauges are placed on the side surfaces 21 (FIG. 1b). In the case with material diminishings the shearing stresses are increased and if the remaining membrane or web is thin and, moreover, is close to the neutral axis 10 the shearing stresses will be especially pronounced, which is illustrated by the curve 22 in FIG. 6. It is also conceivable to permit the material diminishings to comprise a through hole concentrically arranged with the neutral axis 10 or running in parallel with the said axis, whereby the strain gauges are applied on the internal face of the hole. Then, in certain cases it is suibable to place strain gauges on the external surface of the load cell too, which external surface of course can be provided with material diminishings. Even if from manufacturing and operational reasons it will be suitable to form an I-beam at the material diminishings the invention is not in any way limited to this construction. The main thing is that the shearing section and the flanges or the equivalent in the latter case together form a cross-section which has large moments of inertia around its centering axis which are parallel with the figure plane in FIG. 1c and parallel or coinciding with and partly the measuring direction, partly with a direction perpendicular to the measuring direction although the remaining material thickness of the surfaces supporting the strain gauges is small.

It will, of course, be understood that various changes in details of construction and arrangement of parts may be made by those skilled in the art without departing from the scope of the invention as set forth in the appended claims. For example, it may be suitable in certain cases, for example in the embodiment according to FIG. 1a – 1c, to reverse one of the slots 14, and as an additional embodiment there can be mentioned that the horizontal parts of the slots can be reversed 180°. It is also possible to allow the horizontal parts of the slots 14 at the opposite sides 3 and 4 extend along the larger part of the said sides 3 and 4, whereby the sloping parts of the slots shown in FIG. 1a can be allotted extensions which essentially are perpendicular to the said horizontal parts. In view of FIG. 2a the slope of the sloping part of the slot 14 can be made smaller in a more or less extension, and then, it may be possible to permit all the slot parts to coincide so they run in the same direction, which then is better to be perpendicular to the centering axis of the load cell.

As seen in FIG. 1a there can be provided through holes in the membranes to limit the influence of the membranes on the force applied on the load cell. Such a hole 13a is shown in membrane 13.

I claim:

1. A load cell comprising at least two members oppositely movable along a measuring direction which is at least parallel to a first axis extending through said load cell, said members being connected by at least one intermediate section defined by cavities to provide an intermediate membrane, said intermediate membrane being in a plane defined by said first axis and a neutral axis perpendicular to said first axis, said members being further connected by two resilient second membranes disposed on opposite sides of said neutral axis and displaced from said intermediate section, said second membranes lying in planes substantially perpendicular to said first axis, and strain gauges mounted on said intermediate membrane for sensing for deformations in said intermediate membrane.

2. The load cell as defined in claim 1, further including slots on either side of said cavities to define the flanges of an I-beam with said intermediate membrane defining the web of the I-beam.

3. The load cell as defined in claim 2 wherein said slots extend from said cavities to the region of said resilient membranes.

4. The load cell as defined in claim 3 wherein said resilient membranes are disposed on opposite sides of said first axis and said slots extend along lines diagonal to said first axis.

5. The load cell as defined in claim 1 wherein said resilient membranes are provided with at least one hole to limit the influence of said resilient membranes on the force applied to the load cell.

6. The load cell of claim 1 wherein said members are so shaped that said load cell has the configuration of a rectangular parallelepiped.

7. A load cell comprising at least two members oppositely movable in a measuring direction which is at least parallel to a first axis extending through said load cell, said members being connected by at least two intermediate sections defined by cavities to provide intermediate membranes included in a plane defined by said first axis and a neutral axis perpendicular thereto, said intermediate membranes being disposed on opposite sides of said second axis, and strain gauges mounted on said intermediate membranes.

8. The load cell as defined in claim 7 wherein said intermediate membranes are disposed on opposite sides of said first and second axes.

9. The load cell as defined in claim 8 wherein a slot extends from opposite one of said intermediate membranes diagonally to said axes to opposite the other of said intermediate membranes.

10. The load cell as defined in claim 7 wherein said members are so shaped that said load cell has the configuration of a rectangular parallelepiped.

11. The load cell as defined in claim 7 wherein said intermediate membranes act as webs of I-beams.

* * * * *